US00RE34551E

United States Patent [19]

Coup et al.

[11] E Patent Number: Re. 34,551

[45] Reissued Date of Patent: Feb. 22, 1994

[54] DUCTED FAN

[75] Inventors: Michael C. Coup; Gary P. Israel, both of Wichita; Glen W. Ediger, Newton; Donald J. Moore, Wichita, all of Kans.

[73] Assignee: Vornado Air Circulation Systems, Inc., Wichita, Kans.

[21] Appl. No.: 886,230

[22] Filed: May 21, 1992

Related U.S. Patent Documents

Reissue of:

[64] Patent No.: 4,927,324
Issued: May 22, 1990
Appl. No.: 294,780
Filed: Jan. 9, 1989

[51] Int. Cl.[5] ..... F04D 29/70

[52] U.S. Cl. ..... 415/121.2; 415/181; 415/211.2; 416/63; 416/247 R

[58] Field of Search ..... 416/247 R, 246, 63, 416/170 C; 415/121.2, 181, 119, 189, 190, 208.1, 208.2, 209.2, 211.2

[56] References Cited

U.S. PATENT DOCUMENTS

| | | | |
|---|---|---|---|
| 1,062,258 | 5/1913 | Schlotter | 415/210 |
| 2,100,994 | 11/1937 | Cohen | 416/247 |
| 2,154,313 | 4/1939 | McMahan | 415/210.1 |
| 2,169,232 | 8/1939 | Flanders | 415/207 |
| 2,287,822 | 6/1942 | Odor et al. | 415/208.1 |
| 2,330,907 | 10/1943 | Odor et al. | 415/185 |
| 2,554,600 | 5/1951 | Sutton | 415/207 |
| 2,554,601 | 5/1951 | Sutton | 416/247 |
| 2,554,602 | 5/1951 | Sutton | 415/182.1 |
| 2,652,974 | 9/1953 | Fettel | 416/246 |
| 3,173,478 | 3/1965 | Maycen | 416/247 |
| 3,620,644 | 11/1971 | McLarty | 416/247 |
| 3,883,264 | 5/1975 | Rao | 415/208.1 |
| 4,140,433 | 2/1979 | Eckel | 415/209.1 |
| 4,189,281 | 2/1980 | Katagiri et al. | 415/222 |
| 4,657,483 | 4/1987 | Bede | 416/247 |

*Primary Examiner*—John T. Kwon
*Attorney, Agent, or Firm*—Cushman, Darby & Cushman

[57] ABSTRACT

A ducted fan including a funnel-shaped duct positioned upstream of the impeller and connected to a base, an outer cowling concentrically positioned downstream and attached to said duct through a series of ribs, an inner cowling positioned inside the outer cowling and surrounding the impeller and a circular grill attached to the discharge end of the inner cowling. The grill including a center hub and a series of arcuate-shaped ribs extending outwardly from the hub and having a constant curvature of less diameter than the outside radius of the grill whereby the maximum lateral spacing between the ribs is at a radius inboard from the outside radius of the grill.

24 Claims, 9 Drawing Sheets

DUCTED FAN

Matter enclosed in heavy brackets [ ] appears in the original patent but forms no part of this reissue specification; matter printed in italics indicates the additions made by reissue.

BACKGROUND OF THE INVENTION

The present invention is an improved design of the ducted fan set forth in U.S. Pat. Nos. 2,554,602, 2,554,600 and 2,554,601.

The general concept of providing ducted fans with a multiplicity of concentrically spaced cone-shaped ducts in their intakes to increase the air output of the fan has been well known for many decades as typified in U.S. Pat. Nos. 2,287,822 and 2,330,907. Having a ducted fan with multiple cones co-axially spaced in telescoping relation not only provides an increased output at a given power use but also functions as a safety grill in conjunction with the connecting ribs. The outer cowling also can function as a bumper housing to deflect and absorb energy when the fan falls or impacts a stationary object.

All of the above-mentioned patents illustrate fans which could not be sold today by reason of the large grill openings on the front and back of the fans. Current OSHA requirements require consumer fans to have grills with a maximum lateral opening of one-half inch.

It is therefore the principal object of the present invention to provide a new and improved front grill and duct structure which increases the fan's capacity and efficiency while decreasing its sound over the prior art grills or no grills at all.

Another object of the present invention is to provide a new and improved ducted fan wherein the front grill and the inner cowling are integral and are easily removable by deflecting four separate tabs positioned around the periphery of the outer cowling.

Another object of the invention is to provide a new and improved single leg support for the fan which allows the fan to pivotally turn on the support while a preloaded spring counteracts the offset weight of the fan and retains it in place. The support leg also is a conduit for the wires which supply the motor.

Further advantages and features of the invention are set forth in the following detailed description and accompanying drawings which embody the present invention.

DESCRIPTION OF THE PREFERRED EMBODIMENT

Figure 1:
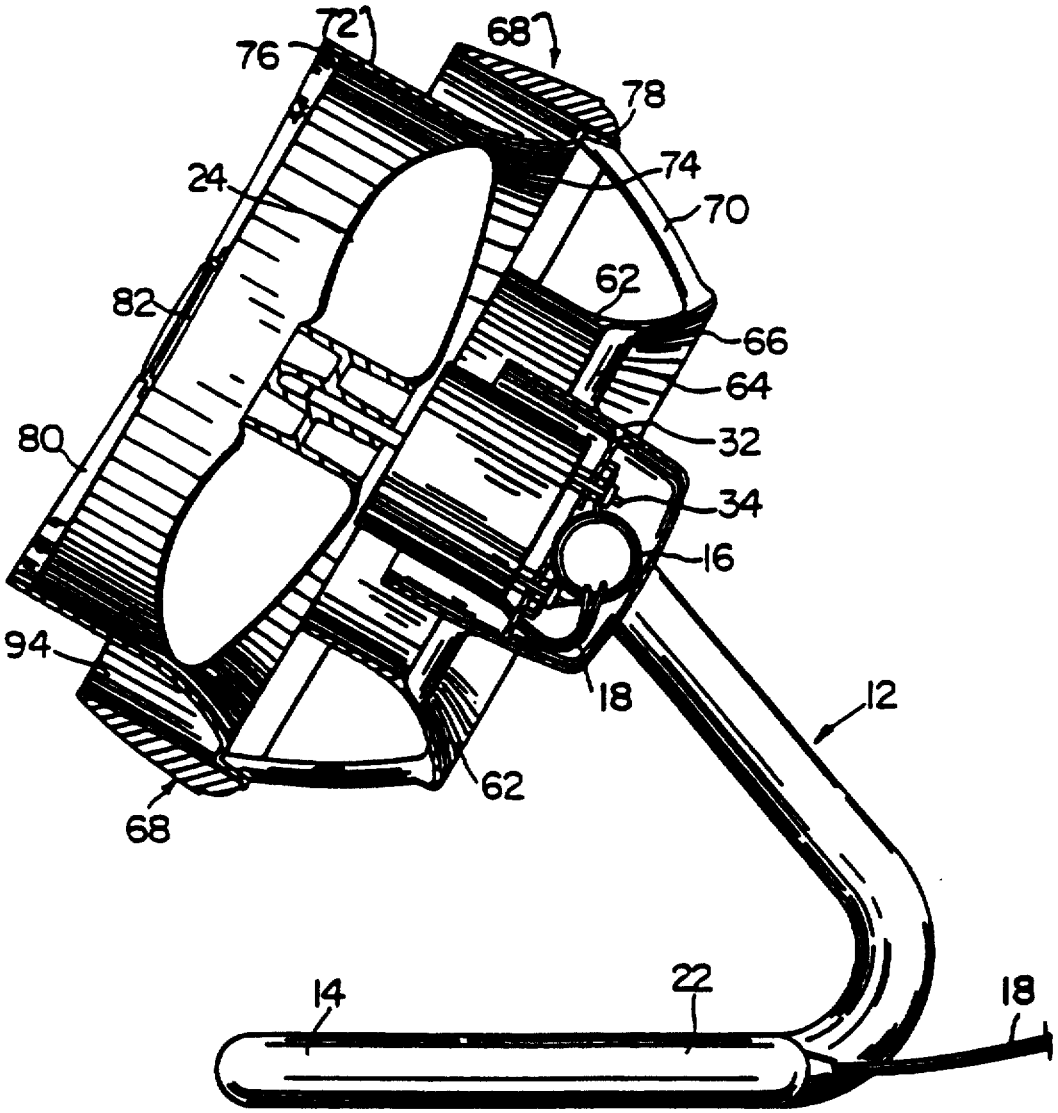
FIG. 1 is a side elevational view of the fan in longitudinal section.

The drawings illustrate a ducted blade-type fan which is generally referred to by reference numeral 10. The fan 10 is mounted on a tubular support leg 12. The leg 12 includes a curved floor-engaging portion 14 and a short horizontal mounting portion 16 to which the fan base 32 is rotatably attached. Support leg 2 is fabricated from steel tubing and bent to its particular shape by commonly-known tube-bending techniques. Support leg 12 also functions as a conduit for the electrical wires 18 from motor 20 which enter leg 12 at its upper end, as seen in FIG. 9, and exit the leg 2 at its lower end 22.

Fan motor 20 carries an impeller blade 24 on its drive shaft which includes three blades 26, 28 and 30. Fan motor 20 is concentrically bolted to base member 32 by four bolts 34. Base member 32 is a plastic injection molded part formed at the same time with duct 62 and outer cowling 68, later described in detail. Formed on base 32 are a series of motor-mounting pads 36. Attaching the support leg 12 to the fan base 32 are a pair of u-shaped straps 38 which urge leg portion 16 against an arcuate-shaped saddle 40 molded in base member 32, as best seen in FIG. 8.

Figure 8:
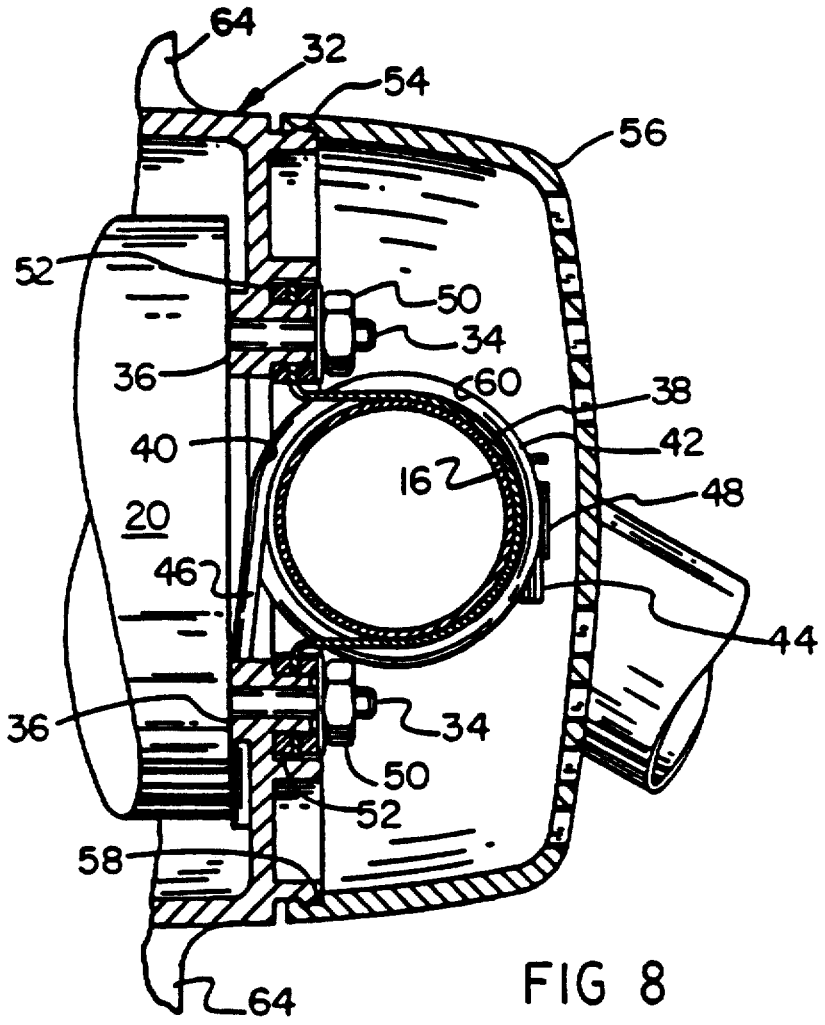
FIG. 8 is a sectional view to an enlarged scale taken along line 8—8 of FIG. 9.
Figure 9:
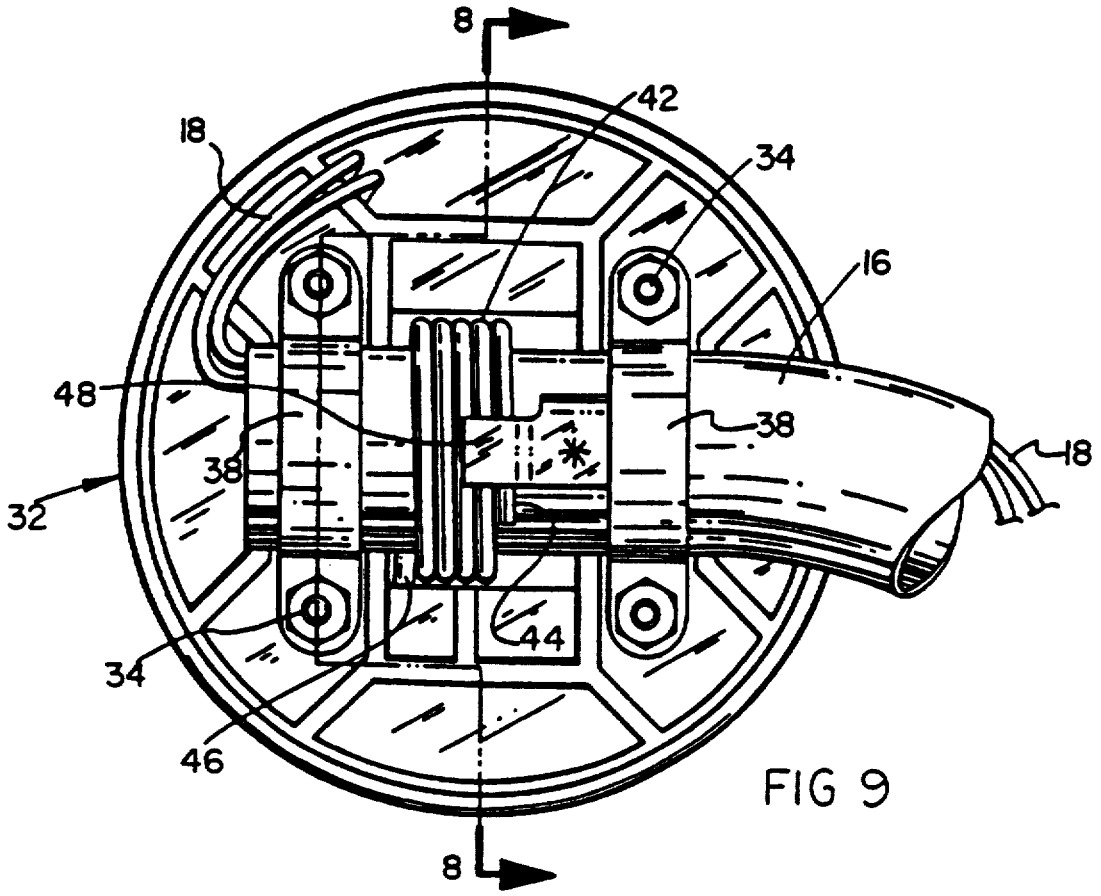
FIG. 9 is a plan view of the fan base and its support leg with the cover plate removed.

Positioned around leg portion 16, as seen in FIGS. 8 and 9, is a coil spring 42 having straight end sections 44 and 46. End section 44 is restrained from movement around the support leg by a small offset tab 48 which is spotwelded to tube 16. The amount of rotating friction between tube 16, saddle 40, and the straps 38 can be determined by tightening nuts 50 on bolts 34. Coil spring 42 when installed, has a preload force acting on motor 20, as best seen in FIG. 8, which urges the motor in a clockwise direction. This preload from spring 42 will offset the weight-created moment from the fan and its ducts attempting to rotate the fan 10 in a counterclockwise direction, as seen in FIG. 1. Also positioned on bolts 34 are a pair of rubber mounts 52 which have the ends of mounting straps 38 sandwiched therebetween.

Base member 32 includes a peripheral ridge 54 which supports a cover plate 56. The cover plate has a matching retention groove 58 around its inside diameter which allows it to be snapped to the base member 32. Cover plate 56 has an circulate opening 60 therein, as seen in FIG. 8, permitting the support leg 12 to pass through.

Figure 4:
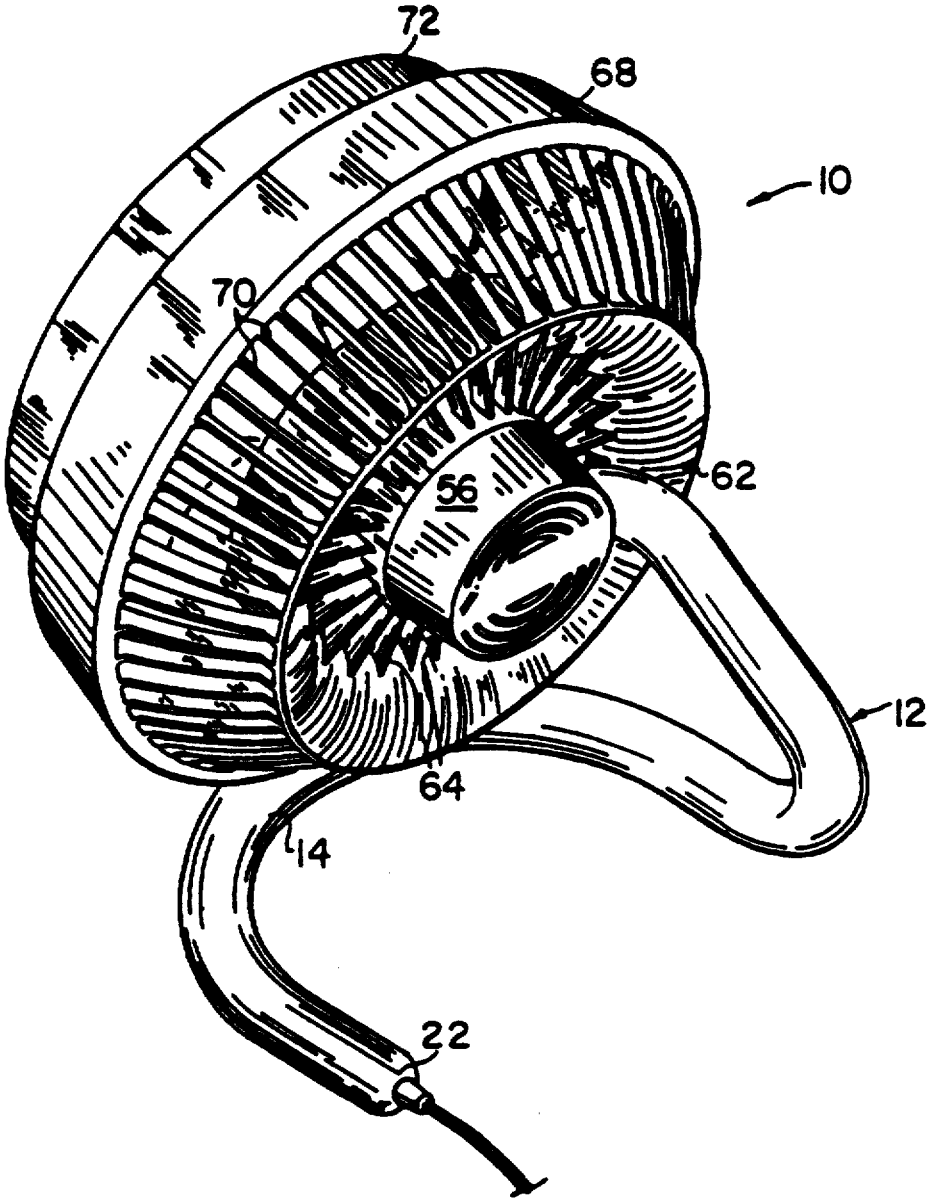
FIG. 4 is a rear perspective view of the fan.

Formed with base 32 is a funnel-shaped duct 62, as best seen in FIG. 1, which connects through a series of radially extending ribs 64, as seen in FIGS. 1 and 4. Duct 62 is tapered outward at its inlet end 66 to a diameter substantially increasing its cross sectional area.

The outer cowling 68 is also formed with duct 62 and is connected to duct 62 by a second series of ribs 70, as seen in FIGS. 1 and 4, which have a similar lateral spacing, as previously-mentioned ribs 64. Base member 32, duct 62 and outer cowling 68 are all molded in a single piece through joining ribs 64 and 70.

Removably positioned within outer cowling 68 is an inner cowling 72 which is also funnel-shaped from its larger intake end 74 to its smaller discharge end 76. Most of the axial length of cowling 68 is a constant diameter similar to discharge end 76.

Figure 7:
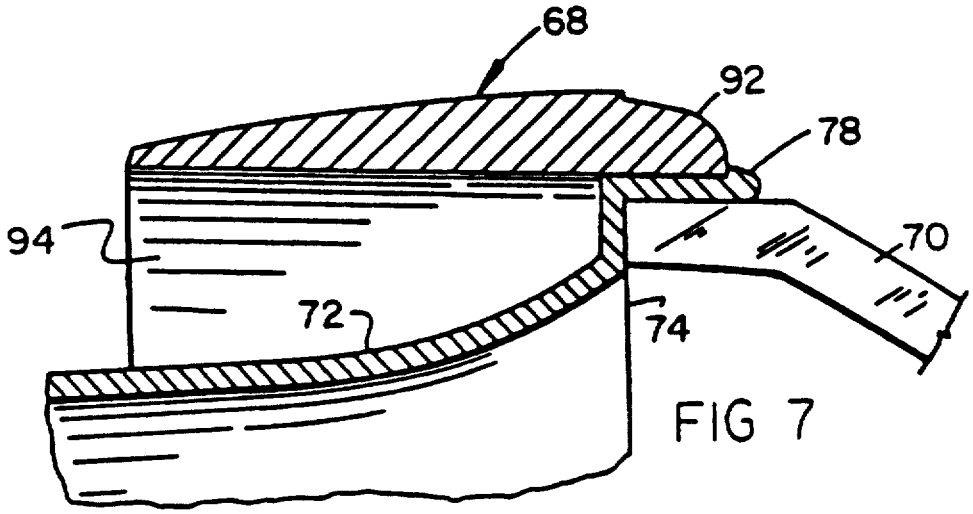
FIG. 7 is a partial sectional view to an enlarged scale of the inner and outer cowling.

Attached to the discharge end 76 is a circular grill 80. Inner cowling 72 is held in place by a series of four tabs 78, as seen in FIG. 7, which are positioned quadrantally around the periphery of the intake end 74 of the cowling. Tabs 78 have hook-shaped ends which, when fully inserted within the outer cowling 68, will engage the edge of outlet cowling 68. These four tabs 78 can be deflected inwardly individually by finger pressure, allowing the grill and inner cowling to separate from the fan structure so as to provide the necessary access to the interior of the fan. The remote posititoning of the four tabs requires at least two separate hand operations which is also a current safety requirement for fan design.

Figure 2:
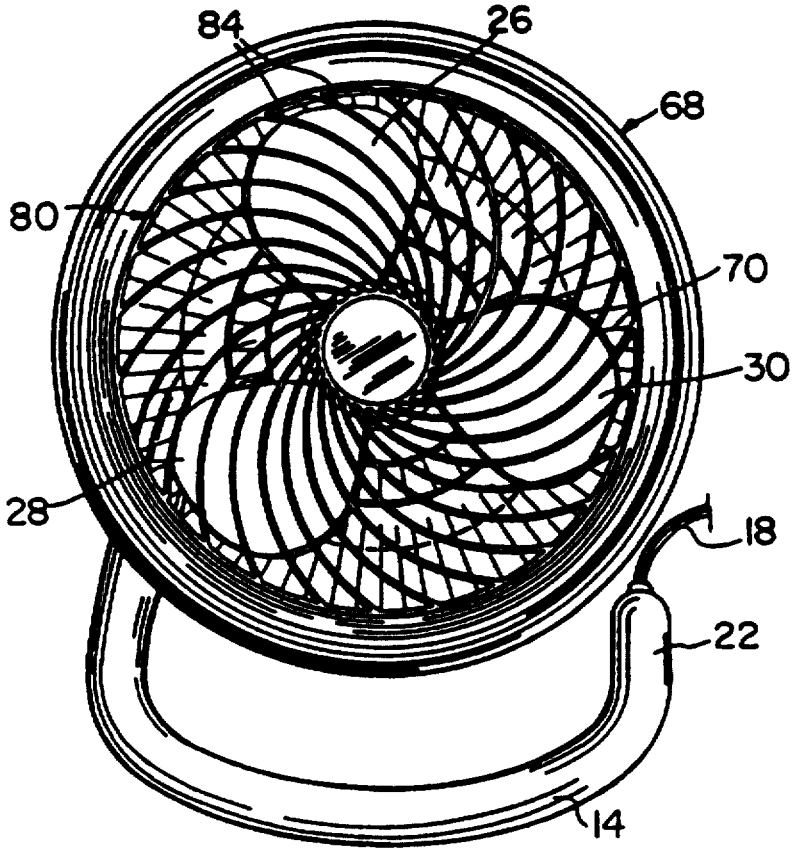
FIG. 2 is a front view of the fan normal to the grill.
Figure 3:
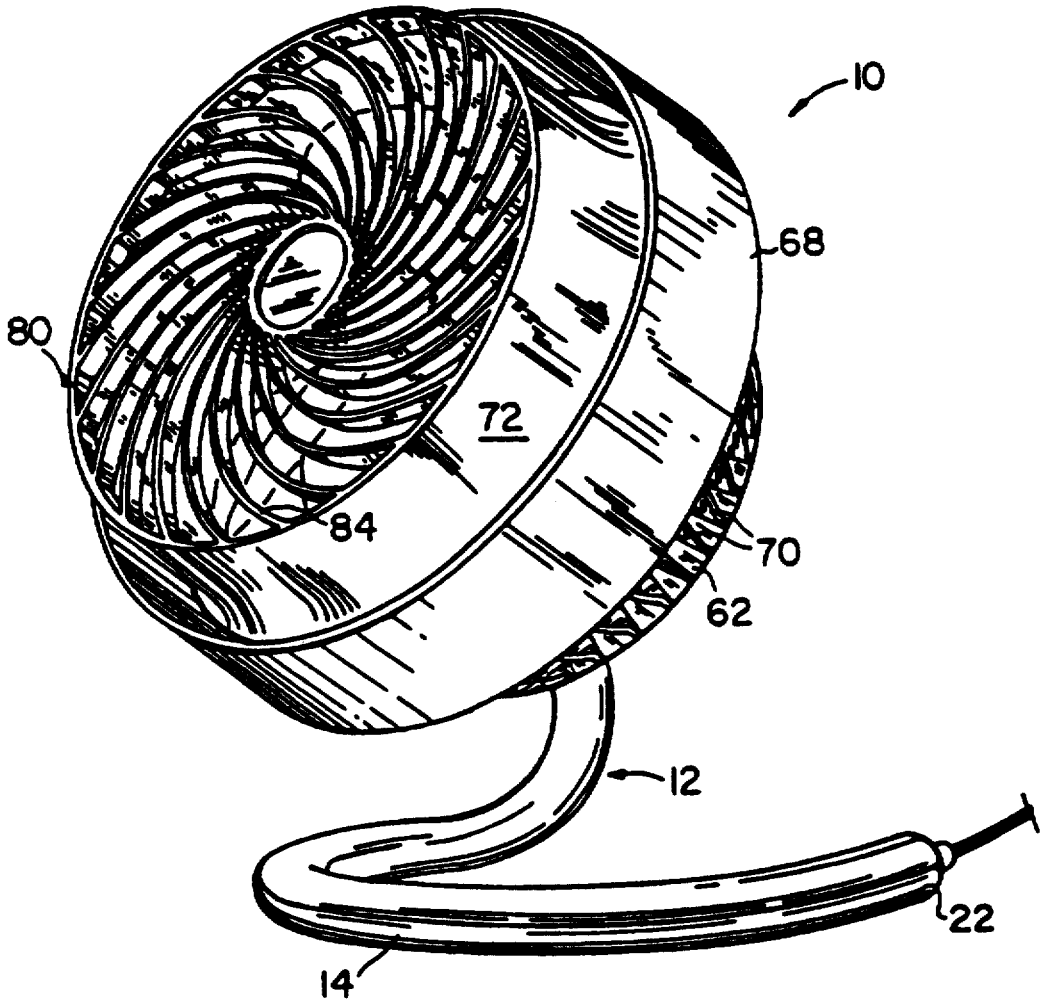
FIG. 3 is a front perspective view of the fan.
Figure 5:
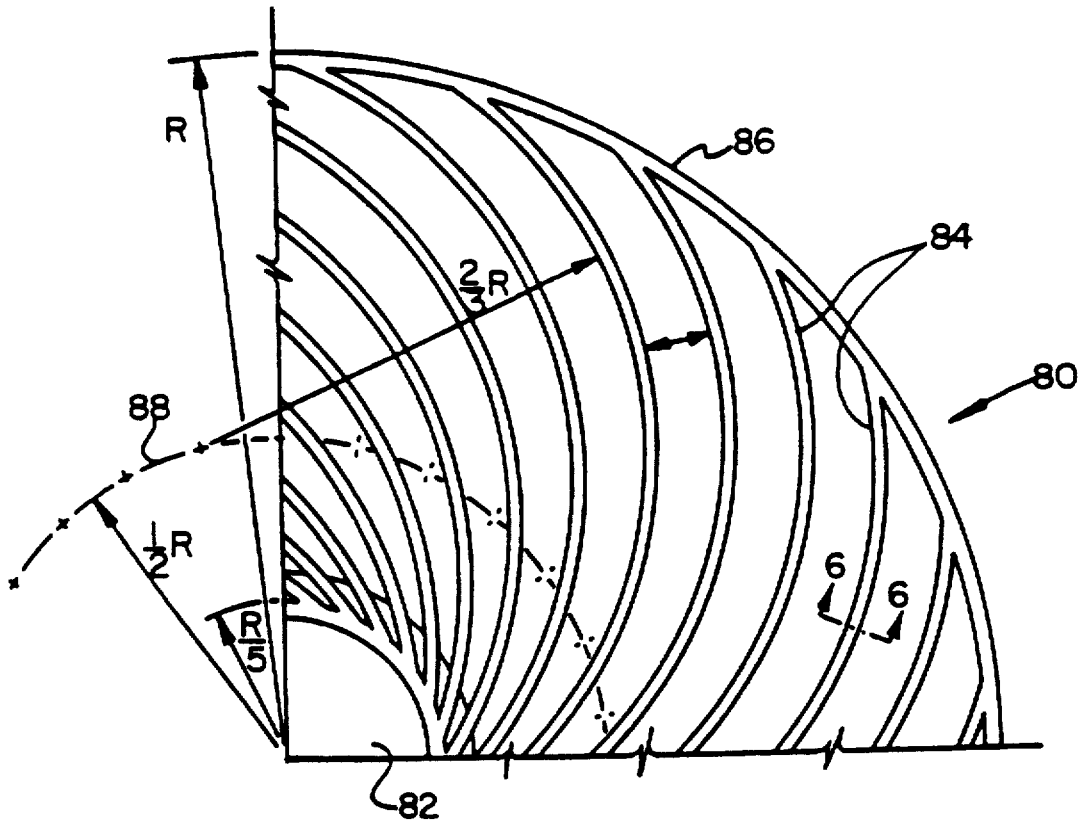
FIG. 5 is a partial plan view of the fan grill to an enlarged scale.

Grill 80 includes a small center hub 82 and a series of arcuate-shaped ribs 84 extending inwardly from the hub, curving to the left, as seen in FIGS. 2 and 5, to the outer radius 86 of the grill. The center of curvature point for each rib 84 lies on a circle 88, as shown in FIG. 5, the radius of curvature of ribs 84 is approximately two-thirds the outer radius of the overall grill. The circle 88 includes a locus of points for the center of curvature of each rib 84 and has a radius approximately one-half the outer radius 86 of the grill. The radius of hub 82 is approximately one-fifth (1/5) the outer radius 86 of the grill. The maximum lateral spacing between any pair of ribs 84 is inwardly from the outer radius 86 of the grill at a point approximate dimension X, as shown in FIG. 5. The impeller blade's point of maximum power is located at approximately 0.6 times its radius. This places the maximum power in a region of the grill wherein the rib spacing is at its maximum. The longer length curved ribs 84, as compared with a conventional straight rib, provides a less rigid grill structure which can be desirable under certain circumstances such as impact shocks.

In viewing FIG. 5, the fan blades not shown move in a clockwise direction from left to right, while the grill ribs 84 curve to the left from the center in the opposite direction which provides an optimum flow of air at a standard power usage.

Figure 6:
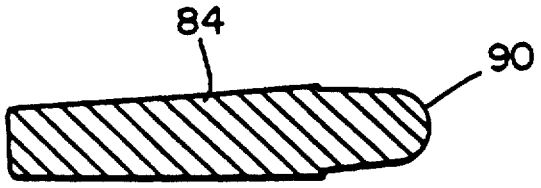
FIG. 6 is a sectional view to an enlarged scale taken along line 6—6 of FIG. 5.

FIG. 6 shows a lateral cross section of a rib 84 with the upstream edge 90 being curved with the remainder of the rib slightly tapered in the overall shape of an airfoil.

Outer cowling 68 is convex in shape with a curve leading edge 92 which together with inner cowling 72 forms the cross sectional shape of an airfoil which minimizes the amount of turbulence and drag produced at the leading edge.

A conventional switch and rheostat for controlling the fan can be located any place on wire 18 either remote of the support leg 12 or preferably at the end 22.

Located between inner cowling 72 and outer cowling 68 is an annular opening 94 which provides a handle for lifting the fan.

Having described the invention with sufficient clarity to enable those familiar with the art to construct and use it, we claim:

1. A ducted fan comprising:

a base member with a motor and bladed impeller attached to the base;

a funnel-shaped duct with its large end facing upstream concentrically positioned upstream of the blades and around the motor and connected thereto;

an outer cowling concentrically positioned, connected to the funnel-shaped duct through a series of radial ribs;

a inner cowling positioned inside the outer cowling and attached thereto, the inner cowling being circular in lateral cross section and tapered longitudinally in shape from its larger diameter intake end to its lesser diameter discharge end;

a circular grill having an outer radius attached to the discharge end of the inner cowling, the grill including a center hub and a series of arcuate shaped ribs extending outwardly from the hub to said outer radius, each rib having a constant curvature radius and each rib being equally spaced from each other around the hub, the maximum lateral spacing between the ribs is inboard from said outer radius; and a support means pivotally attached to said motor and base member.

2. A ducted fan as set forth in claim 1, wherein the ribs of the grill each have a center of curvature which locus of points lies on a circle concentric with the grill at approximately one-half the outer radius of the grill.

3. A ducted fan as set forth in claim 1, wherein the ribs of the grill each have a center of curvature which locus of points lies on a circle concentric with the grill at approximately one-half the outer radius of the grill and the hub has a radius of approximately one-fifth the outer radius of the grill.

4. A ducted fan as a set forth in claim 1, wherein the ribs of the grill have a radius approximately two-thirds the outer radius of the grill with the center of curvature point of each rib lying on a circle concentric with the grill having a radius approximately one-half the outer radius of the grill.

5. A ducted fan as set forth in claim 1, wherein the ribs of the grill each have a center of curvature which locus of points lies on a circle concentric with the grill at approximately one-half the outer radius of the grill and the lateral cross section of each rib has an airfoil shape with its leading edge facing the fan blades.

6. A ducted fan as set forth in claim 1, including multiple tab means positioned around the periphery of the inner cowling's intake end which deflect in and engage the upstream edge of the outer cowling which when all of the tab means are deflected allows separation of the inner cowling and grill from the fan.

7. A ducted fan as set forth in claim 1, including four hook-shaped tab means positioned around the periphery of the inner cowling intake end which deflect in and engage the outer cowling at its upstream edge, which requires two or more manual operations before the inner cowling can be separated from the fan.

8. A ducted fan as set forth in claim 1, wherein the support means is a single tubular metal leg formed to provide a curved floor engaging portion and horizontal mounting portion which engages the base member and electrical wires from the motor which pass through the tubular leg.

9. A ducted fan as set forth in claim 1, wherein the support means is a single tubular metal leg formed to provide a floor-engaging portion and a horizontal mounting portion which engages the base, a preloaded spring means surrounding the horizontal mounting portion of said leg which engages the motor and said metal leg, to provide a spring force to counter balance the offset weight of the fan and mounting brackets which rotatably attach the horizontal mounting portions of said leg to the base, permitting the fan to rotated on tits support means.

10. A ducted fan as set forth in claim 1, wherein the support means is a single tubular metal leg formed to provide a floor-engaging portion and a horizontal mounting portion which engages the base, a preloaded spring means surrounding the horizontal mounting portion of said leg which engages the motor and said metal leg, to provide a spring force to counter balance the offset weight of the fan and mounting brackets which rotatably attach the horizontal mounting portion of said leg to the base permitting the fan to be rotated on its support means, and spring stop means attached to the horizontal mounting portion of said leg comprising an offset tab which engages an end of said spring means preventing the spring from rotating around said leg.

11. A ducted fan comprising:

a base member with a motor and bladed impeller attached to the base which blades rotate in one direction;

a funnel-shaped duct with its large end facing upstream concentrically positioned upstream of the blades and around the motor and connected thereto;

an outer cowling concentrically positioned, connected to the funnel-shaped duct through a series of radial ribs;

a inner cowling positioned inside the outer cowling and attached thereto, the inner cowling being circular in lateral cross section and tapered longitudinally in shape from its larger diameter intake end to its lesser diameter discharge end;

a circular grill having an outer radius attached to the discharge end of the inner cowling, the grill including a center hub and a series of arcuate shaped ribs extending outwardly from the hub and curving in the opposite direction of rotation from said blades to said outer radius, and each rib being equally spaced from each other around the hub, the maximum lateral spacing between the ribs is inboard from said outer radius; and a support means pivotally attached to said motor and base member.

12. A ducted fan as set forth in claim 11, wherein the lateral spacing between the ribs of the grill is no greater than 0.5 inches.

13. A ducted fan as set forth in claim 11, wherein the outer cowling has a convex outer surface with a rounded upstream edge which together with the inner cowling at its intake end forms an aerodynamically clean rounded leading edge.

14. A ducted fan as set forth in claim 11, wherein the outer cowling has a convex outer surface with a rounded upstream edge which together with the inner cowling at its intake end forms an aerodynamically clean rounded leading edge and between the downstream edge of the outer cowling and the inner cowling is an annular cavity which provides a handle for lifting the fan.

15. A ducted fan comprising:

a base member with a motor and bladed impeller attached to the base;

a funnel-shaped duct with its large end facing upstream concentrically positioned upstream of the blades and around the motor and connected thereto;

an outer cowling concentrically positioned connected to the funnel-shaped duct through a series of radial ribs;

a removable inner cowling positioned inside the outer cowling and releasably attached thereto, the inner cowling being circular in lateral cross section and tapered longitudinally in shape from its larger diameter intake end to its lesser diameter discharge end;

a circular grill having an outer radius attached to the discharge end of the inner cowling, the grill including a center hub and a series of arcuate shaped ribs extending outwardly from the hub to said outer radius, and a support means pivotally attached to said motor and base member.

*16. A ducted fan as in claim 15 wherein said outer cowling extends axially toward the discharge end of the inner cowling and is spaced radially outwardly therefrom.*

*17. A ducted fan as in claim 15 wherein the arcuate shaped ribs have a continuous curvature.*

*18. A ducted fan as in claim 15 wherein the funnel shaped duct extends generally axially toward the blades from the series of radial ribs.*

*19. A ducted fan as in claim 15 wherein said outer cowling connects together and rigidifies one set of ends of the series of radial ribs.*

*20. A ducted fan as in claim 15 wherein the curvature of said arcuate shaped ribs is in the opposite direction of rotation from that of said bladed impeller.*

*21. A ducted fan comprised of a base member including a motor and a bladed propeller operatively attached thereto, an entry duct concentrically positioned upstream of the bladed propeller and connected to said base member, an outer member concentrically positioned relative to and connected to said entry duct so as to be spaced therefrom, duct means for enclosing the bladed propeller and having a portion removably connected to allow access to the interior of said ducted fan.*

*22. A ducted fan comprised of a base member including a motor and a bladed propeller operatively attached thereof, an entry duct concentrically positioned upstream of the bladed propeller and connected to said base member, an outer member concentrically positioned relative to and spaced from said entry duct by a series of radially extending ribs, a removable inner member having a portion thereof positioned inside the outer member and releasably attached thereto, the inner member being generally circular in lateral cross-section and terminating at a discharge end, and a grill member having an outer radius attached to the discharge end of said inner member.*

*23. A ducted fan as in claim 22 wherein said removable inner member is positioned and spaced radially within said outer member.*

*24. A ducted fan as in claim 22 wherein said outer member surrounds at least a portion of said inner member.*

* * * * *